United States Patent
Matetic et al.

(10) Patent No.: US 11,303,445 B2
(45) Date of Patent: Apr. 12, 2022

(54) METHOD AND SYSTEM OF PRESERVING PRIVACY FOR USAGE OF LIGHTWEIGHT BLOCKCHAIN CLIENTS

(71) Applicant: NEC Laboratories Europe GmbH, Heidelberg (DE)

(72) Inventors: Sinisa Matetic, Zurich (CH); Karl Wuest, Zurich (CH); Moritz Schneider, Zurich (CH); Kari Kostiainen, Zurich (CH); Ghassan Karame, Heidelberg (DE); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 16/649,148

(22) PCT Filed: Mar. 27, 2019

(86) PCT No.: PCT/EP2019/057714
§ 371 (c)(1),
(2) Date: Mar. 20, 2020

(87) PCT Pub. No.: WO2019/185710
PCT Pub. Date: Oct. 3, 2019

(65) Prior Publication Data
US 2020/0328889 A1   Oct. 15, 2020

Related U.S. Application Data

(60) Provisional application No. 62/649,627, filed on Mar. 29, 2018.

(51) Int. Cl.
*H04L 9/32* (2006.01)
*H04L 9/06* (2006.01)
*G06F 21/62* (2013.01)

(52) U.S. Cl.
CPC ............ *H04L 9/32* (2013.01); *G06F 21/6245* (2013.01); *H04L 9/06* (2013.01); *H04L 9/0643* (2013.01); *H04L 9/3236* (2013.01)

(58) Field of Classification Search
CPC . H04L 9/32; H04L 9/3236; H04L 9/06; H04L 9/0643; G06F 21/6245; G06F 21/62
See application file for complete search history.

(56) References Cited

U.S. PATENT DOCUMENTS

2017/0317997 A1* 11/2017 Smith ................. G06Q 20/02
2018/0109541 A1*  4/2018 Gleichauf ............ H04L 63/123
(Continued)

FOREIGN PATENT DOCUMENTS

WO    WO 2017/220115 A1   12/2017

OTHER PUBLICATIONS

Ethan Cecchetti et al: "Solidus: Confidential Distributed Ledger Transactions via PVORM", IACR, International Association for Cryptologic Research, vol. 20170831 :160538 May 26, 2017 (May 26, 2017), pp. 1-23 (Year: 2017).*

(Continued)

*Primary Examiner* — Jayesh M Jhaveri
(74) *Attorney, Agent, or Firm* — Leydig, Volt & Mayer, Ltd.

(57) ABSTRACT

A method of preserving privacy for usage of a lightweight blockchain client in a blockchain network includes using, in a full blockchain node of the blockchain network, a trusted execution environment (TEE). A secure communication is established between the lightweight blockchain client and the TEE. The TEE receives a request from the lightweight blockchain client for at least one transaction or address of the lightweight blockchain client. The TEE obtains unspent transaction output (UTXO) information with respect to the request from the lightweight blockchain client from a UTXO (Continued)

database by oblivious database access using an oblivious RAM (ORAM) protocol.

14 Claims, 5 Drawing Sheets

(56) References Cited

U.S. PATENT DOCUMENTS

| | | | |
|---|---|---|---|
| 2019/0043048 A1* | 2/2019 | Wright | G06Q 20/405 |
| 2019/0180047 A1* | 6/2019 | Matetic | H04L 9/3247 |
| 2020/0387893 A1* | 12/2020 | Maim | H04L 9/3234 |

OTHER PUBLICATIONS

Arthur Gervais et al: "On the Privacy Provisions of Bloom Filters in Lightweight Bitcoin Clients", International Association for Cryptologic Research, vol. 20141013:202348, Oct. 13, 2014 (Oct. 13, 2014), pp. 1-11 (Year: 2014).*

Cecchetti, Ethan et al. "Solidus: Confidential Distributed Ledger Transactions via PVORM," IACR, vol. 20170831:160538, May 26, 2017, pp. 1-23, XP061023480.

Gervais, Arthur et al. "On the Privacy Provisions of Bloom Filters in Lightweight Bitcoin Clients," IACR, vol. 20141013:202348, Oct. 13, 2014, pp. 1-11, XP061017111.

* cited by examiner

METHOD AND SYSTEM OF PRESERVING PRIVACY FOR USAGE OF LIGHTWEIGHT BLOCKCHAIN CLIENTS

CROSS-REFERENCE TO PRIOR APPLICATIONS

This application is a U.S. National Phase Application under 35 U.S.C. § 371 of International Application No. PCT/EP2019/057714, filed on Mar. 27, 2019, and claims benefit to U.S. Provisional Patent Application No. 62/649,627, filed on Mar. 29, 2018. The International Application was published in English on Oct. 3, 2019 as WO 2019/185710 under PCT Article 21(2).

FIELD

The present invention relates to blockchain networks, and in particular to a method of preserving privacy for usage of a lightweight blockchain client in the blockchain networks. Furthermore, the present invention relates to a full blockchain node disposed in a blockchain network and using a trusted execution environment, TEE, the full blockchain node being configured to preserve privacy for usage of a lightweight blockchain client.

BACKGROUND

One use of blockchain networks is for online transactions using cryptocurrencies, such as Bitcoin. Bitcoin is a fully distributed cryptocurrency that performs time-stamping of incoming transaction coming from its users and orders them in time. Fully distributed entails that Bitcoin operates on top of a peer-to-peer (P2P) network to serve its clients. Time-stamping entails collecting transactions, ordering them by the time of arrival and including them in blocks. These blocks are tied to each other in a manner that each subsequent block contains the hash of the previous block, thereby creating a unique Bitcoin blockchain.

Bitcoin enables its users to perform mutual payments by issuing transactions that are connected to specific addresses. In a regular Bitcoin transaction, bitcoins (BTC) are transferred from one or more input addresses to one or more output addresses. These addresses actually indicate public keys. Only a user that knows the corresponding private key of that public-private key pair may spend the bitcoin connected to a specific public address.

When a user wants to perform a payment she creates a transaction with all the needed parameters, such as input and output addresses along with the amount of BTC that is to be transferred. Subsequently, the transaction is signed and sent to all nodes using the P2P network. Nodes across the network collect transactions and form blocks. These blocks are generated by a special type of nodes (clients) called miners that have to solve a hash-based proof-of-work (PoW) task. The first miner to mine the block broadcasts it to all other nodes for verification of the block correctness and inclusion to the blockchain. Bitcoin is designed in a way that all nodes in the system have to verify the transactions and blocks received from the network. This results in computational and storage intensive operations which are ever increasing with the size of the whole blockchain system.

The original Bitcoin paper, S. Nakamoto, "Bitcoin: A peer-to-peer electronic cash system," (2008) already initially proposed lightweight clients that operate on Simplified Payment Verification (SPV) mode. Unlike full nodes, SPV nodes do not receive and validate all transactions broadcasted to the P2P network, nor do they store the whole blockchain. The verification of all transactions is offloaded to the full node to which the lightweight node connects, while a small and limited subset of transactions is still forwarded. In order for SPV clients to calculate their existing BTC balance, the full node delivers requested blocks to the SPV client based on the search (filter) criteria.

Figure 1:
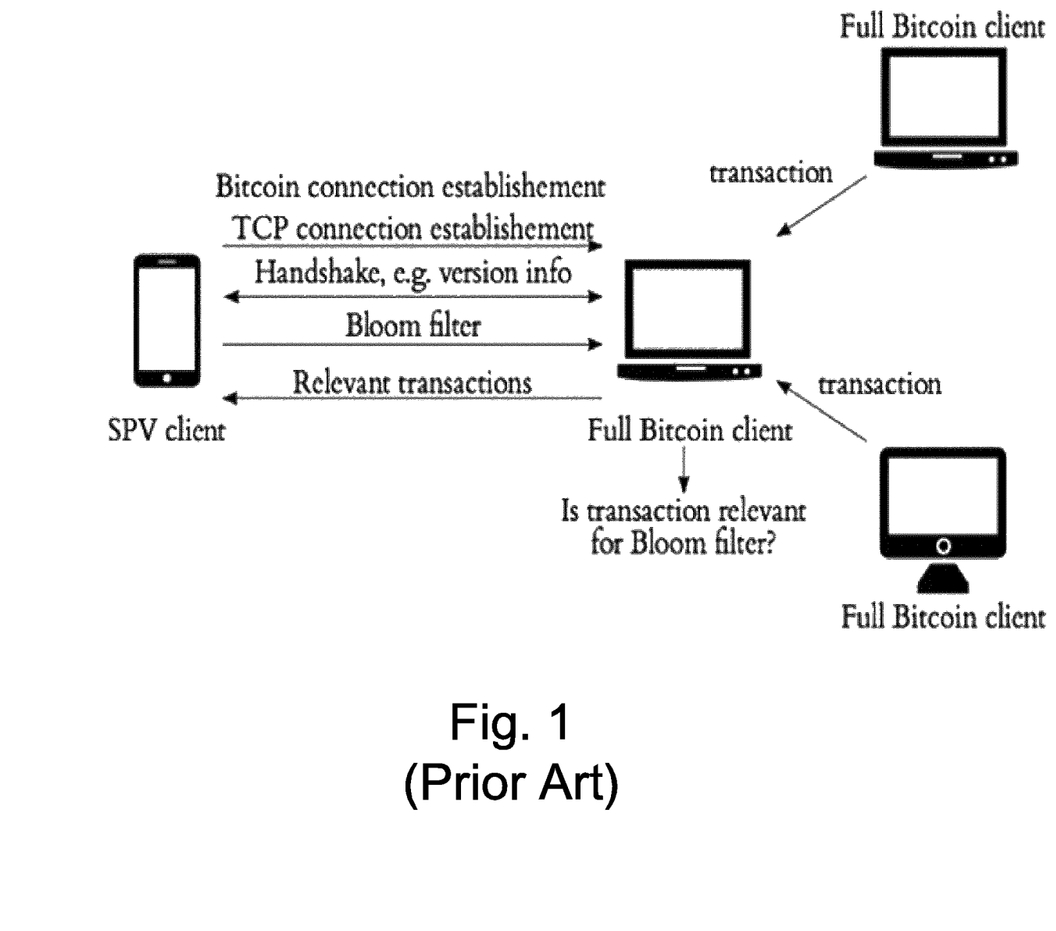
FIG. 1 schematically shows an SPV operation mode using Bloom filters.

The filtering of transactional data from blocks, used to calculate the amount of BTC owned by a specific user using a lightweight client, is currently performed using Bloom filters as schematically shown in FIG. 1. Bloom filters were first introduced by B. H. Bloom, "Space/time trade-offs in hash coding with allowable errors," Communications of the ACM, 13(7), pages 422-426 (1970) as a general schematic. A Bloom filter is a data structure used to evaluate membership of certain elements in the group. Bloom filters are used in lightweight clients in order to provide some level of anonymity and privacy to the end users due the probabilistic characteristics of Bloom filters. In particular, Bloom filters can be defined as using a target false positives rate which will masquerade the requested responses, so that the full node cannot create a clear one-on-one relationship between a client and all addresses. The lightweight client specifies the filter and sends it to the full node. The full node checks if transactions are relevant to this specific Bloom filter, and if yes, forwards them along with the information on amounts back to the lightweight client.

To create a full Bitcoin node, a user has to install the full client node which currently requires 145 GB of space. Due to the increasing popularity of Bitcoin, the volume of transactions is ever increasing. This results in an increase in the size of the Bitcoin blockchain as well. For example, from September 2016 to September 2017, the blockchain grew over 50%, going from a size of 80 GB to a size of over 130 GB of transactional data. Taking into consideration all the available facts, wider deployment and usage of the Bitcoin cryptocurrency, a further steep increase in the blockchain size is expected. The size of the blockchain is not the only concern for the future. Additionally, the large transactional volume also incurs considerable overhead in terms of blocks and transaction verification over the P2P network. Namely, each transaction is broadcasted to all Bitcoin nodes for verification and update of the local chain residing in each node's memory.

For a dedicated full node, built only to support Bitcoin and operate through the protocol, the foregoing constraints might not pose a direct issue. However, with the wider adoption of Bitcoin and the increasing number of users, the foregoing constraints present problems for the blockchain network. Users in general do not want to run full client nodes and verify all incoming transactions, while they still do want to use Bitcoin and perform payments. The reason behind this is that, in order to run a full node, a user would have to have a powerful, resourceful machine that can execute the necessary operations and store the complete blockchain. This reduces the usability drastically.

Since the original Bitcoin paper, the Bitcoin community has released several lightweight clients, such as BitcoinJ, PicoCoin and Electrum. These operate using the SPV mode where only a small portion of the full blockchain is downloaded to accommodate the needs of the specific client. SPV mode allows normal usage of Bitcoin on power and storage-space constrained devices such as mobile phones, tablets, or older personal computers with lower processing capabilities and memory. However, the usage of lightweight clients comes at a cost, primarily privacy loss. In order to be able to run normal Bitcoin operations, the lightweight client has to rely and trust a full node that has access to the complete blockchain. As discussed above, the lightweight clients use Bloom filters in order to achieve some degree of privacy on their operations.

However, the use of Bloom filters to receive Bitcoin transactions from an assisting full node (cf. Section II-B) inherently creates a trade off between network overhead and privacy. If a client increases the false positive rate he receives more transactions from the full node which provide increased privacy, as any of the matching addresses could be his real addresses, but it also means that he needs the network capacity to download all of these transactions. In the extreme cases, the filter matches everything, i.e., the client downloads the full blocks, or the filter only matches the client's addresses, i.e., he has no privacy towards the full nodes.

In addition, A. Gervais, et al., "On the privacy provisions of bloom filters in lightweight bitcoin clients," In Proceedings of the 30th Annual Computer Security Applications Conference, ACM, pages 326-335 (2014) have shown that the use of Bloom filters in Bitcoin lightweight clients leaks more information than was previously thought. In particular, they showed that if the Bloom filter only contains a moderate number of addresses, the attacker is able to guess addresses correctly with high probability (e.g., with 10 addresses, the probability for a correct guess is 0.99). They also show that, even with a larger number of addresses, the attacker is able to correctly identify a client's addresses with high probability if he is in possession of two distinct Bloom filters from the same client (e.g., due to a client restart).

Finally, a lightweight client cannot be sure that he receives all transactions that fit his filter from a full node. While the full node cannot include faulty transactions in the response, as this would be detected by the client when recomputing the Merkle root, the client cannot detect whether he has received all requested transactions. In principle, this problem could be solved by requesting transactions from multiple nodes, which, however, again imposes more network load on the client, therefore creating a tradeoff between reliability and network load.

SUMMARY

In an embodiment, the present invention provides a method of preserving privacy for usage of a lightweight blockchain client in a blockchain network. The method includes using, in a full blockchain node of the blockchain network, a trusted execution environment (TEE). A secure communication is established between the lightweight blockchain client and the TEE. The TEE receives a request from the lightweight blockchain client for at least one transaction or address of the lightweight blockchain client. The TEE obtains unspent transaction output (UTXO) information with respect to the request from the lightweight blockchain client from a UTXO database by oblivious database access using an oblivious RAM (ORAM) protocol.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In view of the above discussion, an embodiment of the present invention improves and further develops a method of preserving privacy for usage of a lightweight blockchain client in a blockchain network as well as a corresponding full blockchain node in such a way that better privacy and efficiency is provided for lightweight blockchain clients.

In accordance with an embodiment of the present invention, the aforementioned improvements and developments are accomplished by a method of preserving privacy for usage of a lightweight blockchain client in a blockchain network, the method comprising:

using, in a full blockchain node of the blockchain network, a trusted execution environment, TEE;

establishing a secure communication between the lightweight blockchain client and the TEE;

receiving, by the TEE, a request from the lightweight blockchain client for at least one transaction or address of the lightweight blockchain client; and by the TEE, obtaining unspent transaction output, UTXO, information in respect to the lightweight blockchain client's request from a UTXO database by means of oblivious database access using an oblivious RAM, ORAM, protocol.

Furthermore, according to another embodiment of the present invention, the aforementioned improvements and developments are accomplished by a full blockchain node disposed in a blockchain network and using a trusted execution environment, TEE, the full blockchain node being configured to preserve privacy for usage of a lightweight blockchain client by providing for execution of the following steps:

receiving a request from the lightweight blockchain client for a setup of a secure communication;

receiving a request from the lightweight blockchain client for at least one transaction or address of the lightweight blockchain client;

obtaining, by the TEE, unspent transaction output, UTXO, information in respect to the lightweight blockchain client's request from a UTXO database by means of oblivious database access using an oblivious RAM, ORAM, protocol; and sending, by the TEE, a response to the request from the lightweight blockchain client for the at least one transaction or address, the response including the obtained unspent transaction output, UTXO, information.

According to an embodiment of the present invention it has been recognized that a solution, in which an implementation of a trusted execution environment, TEE, at the full blockchain node is combined with an oblivious database access using an ORAM mechanism, allows lightweight clients to outsource block and transaction verification to the TEE, thereby providing a higher level of privacy, as well as introducing substantial performance improvements and offering even lighter operation for potentially performance restricted devices. Embodiments of the invention thus focus on reducing the load of lightweight clients in terms of computation and network while offering even better privacy preservation (the client's last known block does not leak). Embodiments of the invention allow lightweight clients to send requests containing addresses of their interest and directly receive information regarding unspent outputs, without the need to verify block headers and Merkle tree paths. As a result, the method according to an embodiment of the present invention provides strong privacy protection and additionally improves performance of current lightweight payment verification.

Basically, the method according to An embodiment of the present invention does not change the normal operation mode of the existing full bitcoin nodes. None of the full node components, such as participation in the peer-to-peer network, mining, etc. are transferred to the TEE. Thus, the TEE only performs operations that are relevant to the connected lightweight clients and can be seen more as an add-on to the currently deployed infrastructure. Additionally, the system does not change the way how lightweight clients execute payments. Lightweight clients, as currently deployed in prior art solutions, communicate directly to the full node to make a payment. Specifically, embodiments of the present invention focus on the reception of the information from the full nodes, thus aiming to preserve privacy when the client inquires information about the client's transaction.

Figure 2:
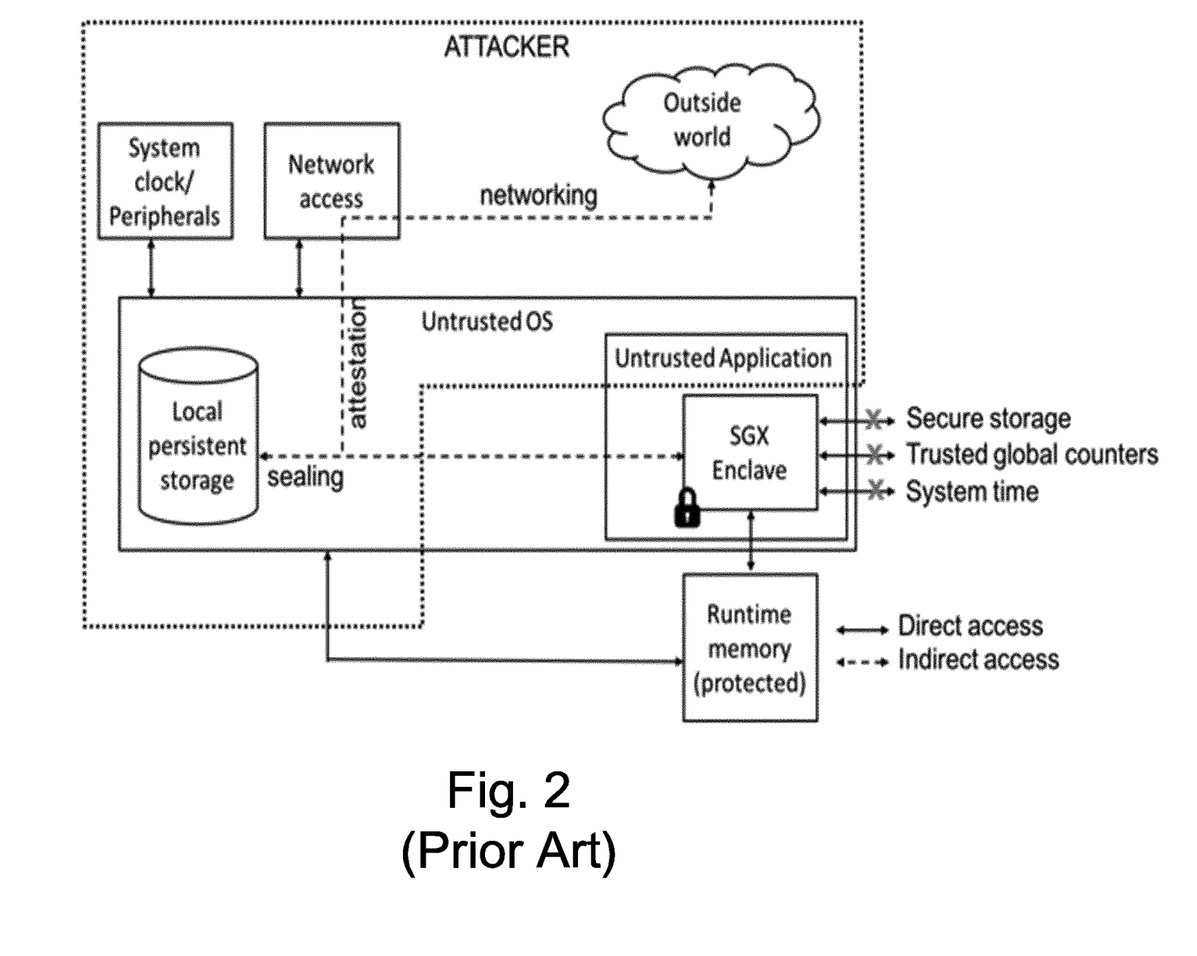
FIG. 2 schematically shows an SGX operational mode.

According to embodiments of the present invention, the trusted execution environment, TEE, is implemented in form of secure software guard extensions, SGX, enclaves. This technology, which is schematically illustrated in FIG. 2 and described by V. Costan, et al., "Intel SGX explained.", in Cryptology ePrint Archive (2016), enables execution of security-critical application code, called enclaves, in isolation from untrusted system software. Protections in the processor ensure that a malicious operating system (OS) cannot read or modify enclave memory at runtime. To protect enclave data across executions, SGX provides a security mechanism called sealing that allows each enclave to encrypt and authenticate data for persistent storage. SGX-enabled processors are equipped with certified cryptographic keys that can issue remotely verifiable attestation statements on the software configuration of enclaves. Through these security mechanisms (isolation, sealing, attestation) SGX enables development of various applications and online services with hardened security. While SGX has been used for consensus realization, it has not been discovered prior to the present invention to have any utility in implementing lightweight clients in a blockchain network. SGX enclaves have access to the protected runtime memory only, while any other outside communication has to go through the unsecure application. Additionally, enclaves do not have access to any secure storage, trusted global or system time.

For runtime isolation, the SGX security architecture guarantees that enclaves are isolated from all software running outside of the enclave, including the OS, other enclaves, and peripherals. Isolation means that the control flow integrity of the enclave is preserved and other software cannot observe its state.

Enclaves can save confidential data across executions. Sealing is the process to encrypt and authenticate enclave data for persistent storage and is further described by B. Alexander, "Introduction to Intel SGX Sealing, (2016), also incorporated by reference herein. All local persistent storage (e.g., disk) is controlled by the untrusted OS. For each enclave, the SGX architecture provides a sealing key that is private to the executing platform and the enclave.

As an alternative to SGX enclaves, the trusted execution environment, TEE, may be implemented by employing AMD's secure technology or by utilizing ARM's TrustZone technology (as described at https://www.arm.com/products/silicon-ip-security).

According to embodiments of the present invention, the method leverages the well-known technique of Oblivious RAM (ORAM) that hides external access patterns for incoming request, thereby removing the relationship with the files on disk and the content of the request. This variant allows even lighter lightweight clients that offload the computation of all verifications to the secure enclaves.

According to embodiments of the present invention new indexed database structures of unspent transactions (denoted 'secure UTXO' that resemble the 'original UTXO' maintained by the full blockchain node) are created and searched for every client request in an obfuscated mode using ORAM to preserve privacy when accessing the database on disk.

According to embodiments of the present invention, the used ORAM protocol is the Path ORAM protocol. Every request in Path ORAM reads $O(\log N)$ blocks (where N denotes the total transactions in the block), stores some of them in the stash and writes some blocks re-randomized back to disk. An attacker can never know which block was initially requested, which blocks are written back and which are kept in the stash. The application for using ORAM in a method according to embodiments of the invention is slightly different than the one presented in the original publication (E. Stefano et al., "Path ORAM: An Extremely Simple Oblivious RAM Protocol", in Proceedings of the 2013 ACM SIGSAC Conference on Computer & Communications Security, pages 299-310, ACM, 2013), in such a way that it is not used in a traditional client/server setting. Instead, the attacker can use it as an oracle, i.e. he can influence the data that is written (by delivering blocks to the enclave) and can query for values himself. Regardless of that, due to the security properties of ORAM, i.e. no linkability of accesses, the attacker still learns nothing about what is accessed. The inner buckets of the ORAM database are constantly reshuffled and the probability to guess correctly which ORAM block was accessed is equal to that of a random guess. As the responses transmitted to lightweight clients responsive to their requests can be constructed to always have a constant size and since the attacker cannot infer any information from disk accesses due to the properties provided by the Path ORAM mechanism, full privacy is provided for the lightweight client.

According to embodiments of the present invention, prior to sending a request to the TEE, such as an SGX enclave, the lightweight blockchain client performs an attestation with the TEE, possibly accompanied by the execution of an authentication mechanism. Attestation is the process of verifying that a certain enclave code has been properly initialized. In local attestation, a prover enclave can request a statement that contains measurements of its initialization sequence, enclave code and the issuer key. Another enclave on the same platform can verify this statement using a shared key created by the processor. In remote attestation, the verifier may reside on another platform. In either case enclave attestation guarantees honest enclave execution.

Embodiments of the present invention reduce the load of lightweight clients in terms of computation and network, while at the same time mitigating the privacy preservation issues that arise with lightweight clients by using trusted execution environments. As discussed above, these privacy preservation issues are unique to the blockchain network implementing lightweight clients. While usage of lightweight clients for the blockchain network, such as Bitcoin, introduces many benefits for the end user since users may perform payments on resource-constrained devices and without too much communication overhead, the increased usability comes at a price, including a loss of privacy. When a lightweight client wishes to verify the available amount of BTC on its addresses, the lightweight client has to send some identifying information to the full node in order to get a response. Bloom filters were introduced to solve the problem, but as recent work shows, information leakage still occurs when using Bloom filters.

Embodiments of the present invention allow lightweight clients, while preserving their privacy, to send requests containing addresses of their interest and directly receive information regarding unspent outputs, without the need to verify block headers and Merkle tree paths by redesigning and improving a full blockchain node. At the same time, full functionality can remain unchanged. Thus, another security layer is provided to protect the privacy of lightweight clients without compromising operability of the system. According to embodiments of the present invention, a lightweight client is able to retrieve information about the amount of BTC connected to the addresses of the lightweight client without insecurely releasing any information about these addresses to the full node. While described herein at parts with respect to the Bitcoin system, embodiments of the present invention also apply to other blockchain systems.

An attacker model is designed to address a powerful adversary who controls the operating system (OS) and any other privileged software on the full blockchain node. The adversary could be a malicious user who owns the computing platform that runs the full node software or an external adversary that has compromised the full node software, including its OS, remotely. To support the trusted execution environment, SGX software guard extensions are used. It is noted, however, that other TEE technologies with similar characteristics can be implemented likewise. In the context of the attacker model, SGX is modeled in accordance with an embodiment of the present invention in such a way that the adversary has the ability to schedule and restart enclaves, start multiple instances, block, delay, read, or modify all messages sent by enclaves, either to the OS itself or to other entities over the network. Additionally, it is assumed that the adversary is able to control networking between lightweight clients and full nodes. Namely, the adversary is able to sniff all network traffic, delay, block, re-route and create network packets. This resembles a Dolev-Yao network attacker with the additional capability of control over the full node OS.

However, in accordance with an embodiment, SGX is further modeled in such a way that the adversary cannot break the hardware security enforcements of SGX. That is, the adversary cannot access processor-specific keys (e.g. attestation or sealing key) and he has no ability to read or modify enclave runtime memory (which is encrypted and integrity protected by the CPU), nor to learn any information about the private data held in the enclave data. Also, the adversary cannot break any cryptographic primitives provided by the SGX architecture, nor the primitives created by a developer that reside and operate inside of the isolated execution environment. Further, the adversary cannot compromise the lightweight client and extract information from it directly (e.g., communication between the lightweight client and the full node is cryptographically protected).

According to embodiments of the present invention, it is assumed that the lightweight clients connect to full blockchain nodes when they want to acquire information about their transactions and available amounts of BTC. The design of the lightweight clients can remain generally the same, but the lightweight clients are not designed to use Bloom filters. Due to the introduction of a secure architecture inside of the full Bitcoin nodes in accordance with embodiments of the present invention, Bloom filters, as a method for preserving privacy, are not needed since the privacy is guaranteed by the usage of SGX enclaves in combination with an ORAM mechanism adapted for use in the inventive arrangements of the present invention in a full node of the blockchain network. Lightweight clients can directly send requests for their transactions to the full nodes (although in an encrypted form).

A high-level system model can resemble the one shown in FIG. 1, without Bloom filters and with an improved full node, as will be described in further detail below. Lightweight clients connect to one of the improved full nodes that support full privacy preservation and allows lightweight clients to outsource computational work, such as block and transactional verification, to a secure enclave residing on the full node. A lightweight client can choose any available full node to connect to. The connection establishment between the lightweight client and the full node uses secure bootstrapping for confidential communication between the client and the enclave residing in the full node. These two entities perform an authenticated Diffie-Helman key exchange to establish a session key. The lightweight client has a unique identifier with which it can authenticate to the full node for future sessions. This is advantageous for frequent, repeated or incrementally larger requests. After the session is established, the lightweight client sends a message containing all of the transaction for which the lightweight client needs additional information.

FIG. 2 schematically shows an operational mode using an SGX enclave, as implemented in embodiments of the present invention. Software Guard Extensions (SGX) by INTEL, as described by V. Costan, et al., "Intel SGX explained.", in Cryptology ePrint Archive (2016) which is incorporated by reference herein, enables execution of security-critical application code, called enclaves, in isolation from untrusted system software. Protections in the processor ensure that a malicious OS cannot read or modify enclave memory at runtime. To protect enclave data across executions, SGX provides a security mechanism called sealing that allows each enclave to encrypt and authenticate data for persistent storage. SGX-enabled processors are equipped with certified cryptographic keys that can issue remotely verifiable attestation statements on the software configuration of enclaves. Through these security mechanisms (isolation, sealing, attestation) SGX enables development of various applications and online services with hardened security. SGX enclaves have access to the protected runtime memory only, while any other outside communication has to go through the unsecure application. Additionally, enclaves do not have access to any secure storage, trusted global or system time. While SGX enclaves are commonly used in particular for consensus realization, embodiments of the present invention use an SGX enclave in connection with implementing lightweight clients in a blockchain network.

For runtime isolation, the SGX security architecture guarantees that enclaves are isolated from all software running outside of the enclave, including the OS, other enclaves, and peripherals. Isolation means that the control flow integrity of the enclave is preserved and other software cannot observe its state.

Figure 3:
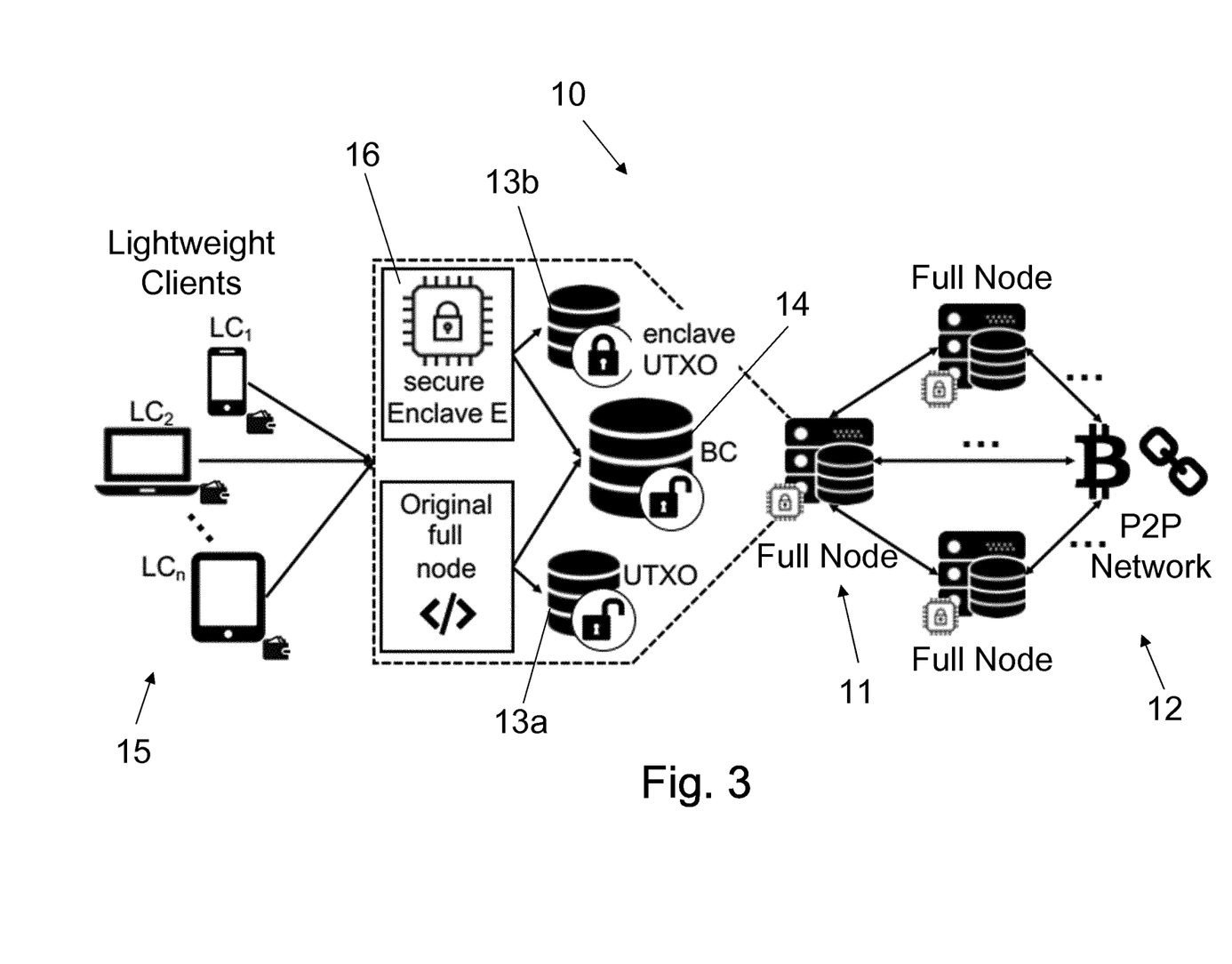
FIG. 3 schematically shows an improved full node in accordance with an embodiment of the present invention.

FIG. 3 schematically shows a low-level model of an improved full node model implemented in a blockchain network 10. On initialization (i.e., first installation of the node), a full node 11 has to download the full blockchain 14 from the P2P blockchain (e.g., Bitcoin) network 12. Next, the full node 11 has to create a database of unspent transaction outputs (UTXO) 13a by scanning through the whole blockchain 14. UTXO database 13a, which is maintained together with the blockchain 14 on the local full node 11 storage, will be termed hereinafter 'original UTXO'. This original UTXO 13a will be used by the enclave 16 to build its own UTXO database 13b, by using an ORAM mechanism, as will be explained in greater detail below in connection with FIG. 5. This UTXO database 13b is the enclave's own secure UTXO, which will be termed hereinafter 'enclave UTXO'. For each request from a lightweight client 15 the enclave 16 extracts the necessary information from the enclave UTXO 13b. Both databases, i.e. original UTXO 13a and enclave UTXO 13b, are updated regularly as each new block is appended to the blockchain 14. The changes to the full node 11 do not change the operation mode of the node for normal Bitcoin operation, neither are any of the components for verifying transactions, mining, etc., transferred to the secure SGX enclave 16. The SGX enclave 16 only performs operations that are relevant to the connected lightweight clients 15.

After receiving the message from a lightweight client 15, the full node 11 forwards the request to the SGX enclave 16, which decrypts it and extracts the transactions. To form a response for the specific lightweight client 15, the SGX enclave 16 has to access the enclave UTXO 13b, search through it, and save all the matching information for these transaction, as will be explained in greater detail below in connection with FIG. 5. The results may be cached in the SGX enclave 16 and pinned to a specific identifier of the lightweight client 15. In this way, a repeated request from the same lightweight client 15 can be processed quickly. After a response is created, it is encrypted with the session key and returned to the requesting lightweight client 15. The lightweight client 15 receives and decrypts the response, acquiring the needed information.

Figure 4:
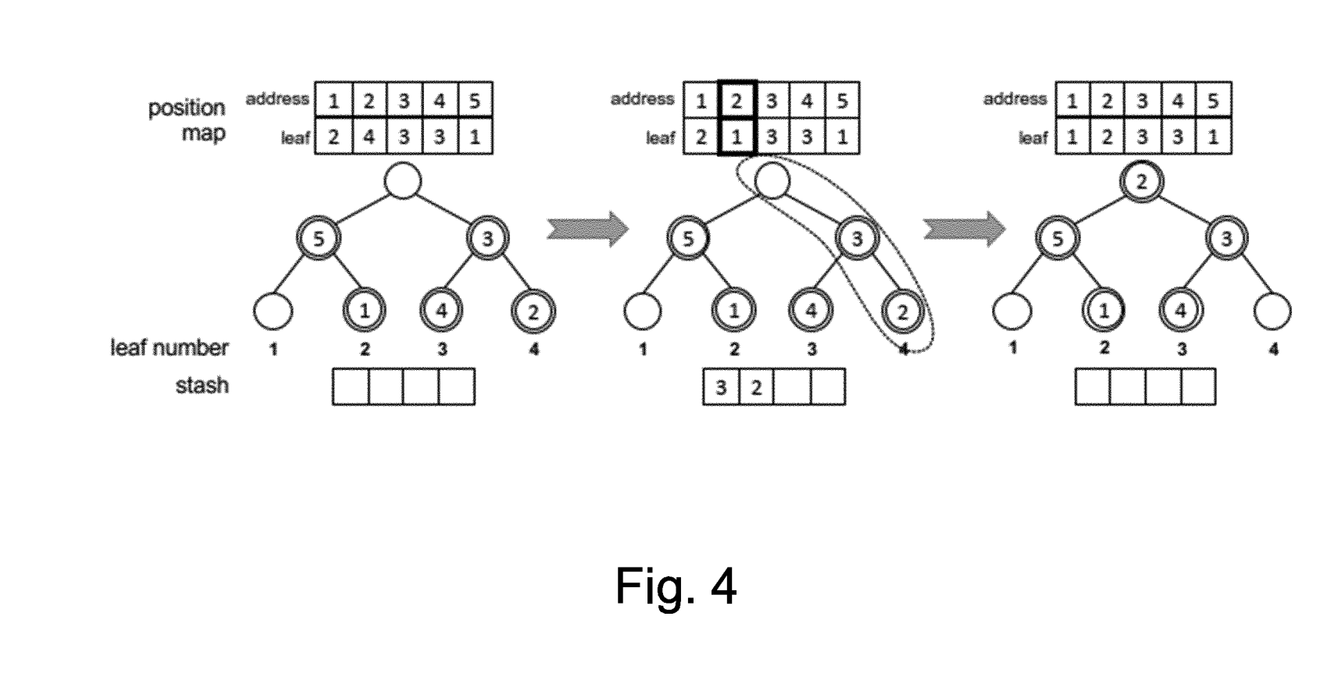
FIG. 4 is a diagram schematically illustrating an example of data access in Path ORAM, and FIG. 5 schematically shows a system protocol for communication between lightweight clients and a full node in accordance with an embodiment of the present invention.

FIG. 4 shows an example of data access in Path ORAM that is adapted for use in the inventive arrangements of the present invention in a full node 11 of the blockchain network 12. Oblivious RAM (ORAM), initially proposed by Goldreich et al. "Software protection and simulation on oblivious rams", in Journal of the ACM (JCAM), 43(3): 431-473, 1996, is a well-known technique that hides access patterns to an encrypted storage medium. A typical ORAM model is one where a trusted client wants to store sensitive information on an untrusted server. Encrypting each data record before storing it on the server provides confidentiality, but access patterns to stored encrypted records can leak information, such as correlation of multiple accesses to the same record. The intuition behind the security definition of ORAM is to prevent the attacker from learning anything about the access pattern.

In ORAM the attacker does not learn any information about which data is being accessed and when, whether the same data is being repeatedly accessed (i.e., unlinkability), the pattern of the access itself, and lastly the purpose, type of the access (i.e., write or read). However, one should note that ORAM techniques cannot hide access timing.

Embodiments of the present invention use a popular and simple ORAM algorithm called Path ORAM, as described by E. Stefano et al., "Path ORAM: An Extremely Simple Oblivious RAM Protocol", in Proceedings of the 2013 ACM SIGSAC Conference on Computer & Communications Security, pages 299-310, ACM, 2013 which is incorporated by reference herein, that provides a good trade-off between client side storage and bandwidth. As shown in FIG. 4, the storage is organized as a binary tree with buckets containing Z chunks each. The position of each chunk is stored in a position map that maps an address to a leaf in the tree, and for every access the leaf of the accessed entry is re-randomized. A small amount of entries is stored in a local (i.e. enclave memory) structure called stash.

Every access involves reading all buckets of a path from the root to a leaf into the stash and then writing back new or old re-randomized data from the stash to the same path resulting in an overhead of O(log N) read/write operations. If the requested chunk is already in the stash, an entire path still gets read and written back. In order to keep the local stash as small as possible the path to be written back is greedily filled with chunks.

The summary of data access is as follows:
1) Get leaf from position map;
2) Generate new random leaf for the address and insert it into the position map;
3) Read all buckets along the path to the leaf and put them into the stash;
4) If access is a write, replace the specified chunk in the stash with the new chunk;
5) Write back some chunks from the stash to the path. Blocks can only be put into the path if their leaf from the position map allows it. Blocks are pushed down as far as possible into the tree to minimize the required stash capacity; and
6) Return requested chunk.

Figure 5:
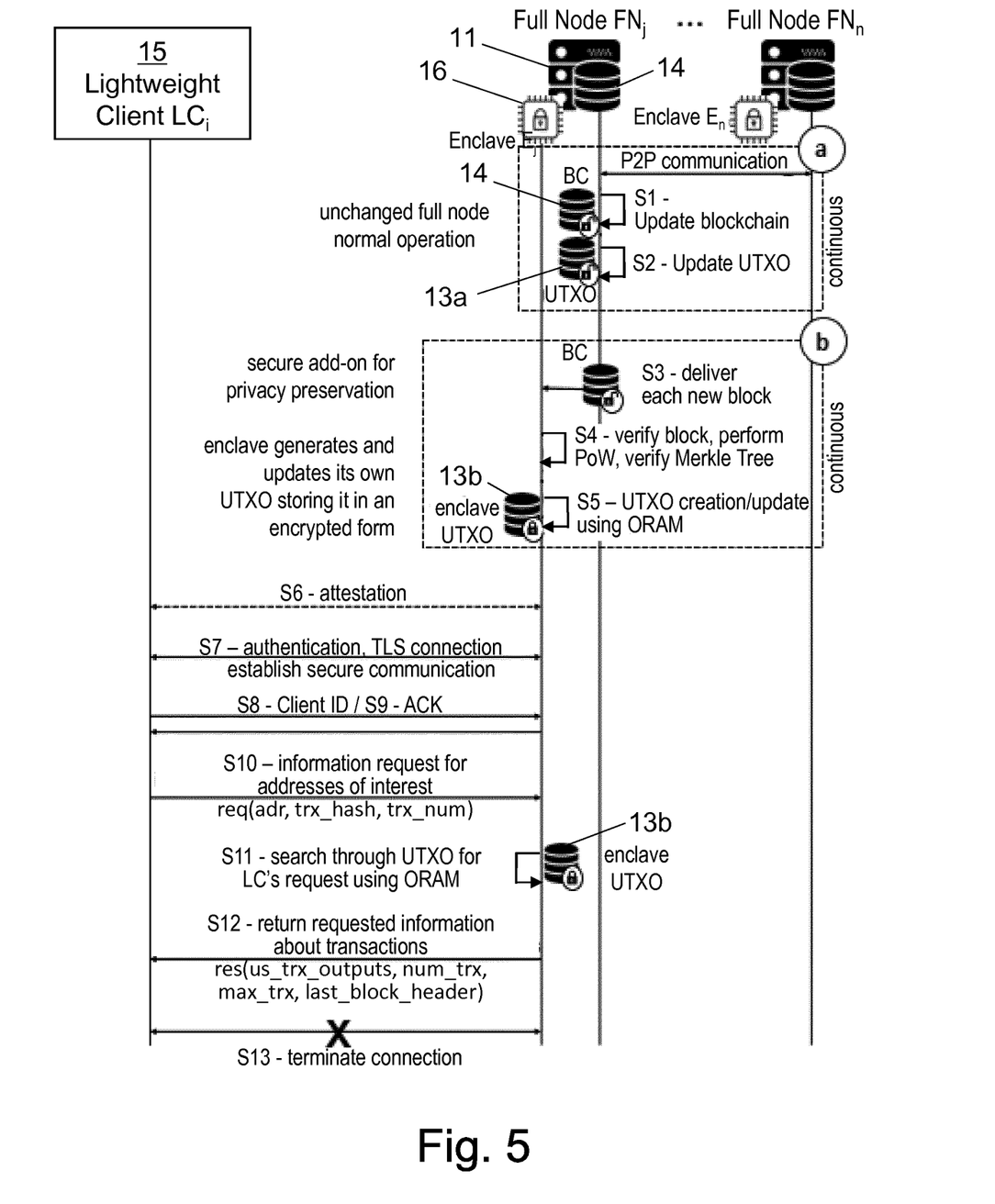

FIG. 5 illustrates details of a system protocol for the above-described system in more detail. While the upper part of the protocol, i.e. the two dashed line boxes, relate to the process of initialization of the full blockchain node 11—box (a)—and the SGX enclave 16—box (b)—adapted for use in the full blockchain node 11, the lower part of the protocol relates to the requested information retrieval of the lightweight blockchain client 15.

On system initialization, the full node 11 connects to the rest of the P2P network 12 and synchronizes. In steps S1 and S2, the full node 11 periodically or continuously updates in local storage the databases of the blockchain 14 and the UTXO 13a, respectively. Preferably, steps S1 and S2 are performed after each transaction is performed by or broadcasted to the full node 11 for verification.

As shown in step S3, each new block of the blockchain 14 is provided to the enclave 16, either through a delivery process or by the enclave 16 accessing the local database of the full node 11 and obtaining the new blocks continuously. As shown in step S4, during first initialization, the enclave 16 reads the whole blockchain 14 and verifies each block including PoW and transactions. Due to the limited memory size of the enclave 16, this process may be done by reading chunks of blocks sequentially.

If all operations are successful, the enclave builds its own UTXO database 13b. For distinction, hereinafter the UTXO database 13b will be termed 'enclave UTXO', while the UTXO database 13a in the full node's 11 local storage will be termed 'original UTXO'. The enclave UTXO 13b is a special version of the original UTXO 13a structure present today in full nodes. However, the enclave UTXO 13b set is first encrypted on the disk as sealed storage, second indexed for easy and fast access depending on the lightweight client's 15 request, and third, randomized using ORAM to prevent intersection attacks/observations when the enclave 16 accesses the disk for a specific unspent output. This whole operation, in form of ORAM updates, which is denoted by step S5 in FIG. 5, is done continuously after the first initialization with each new block. File access and consecutive randomization will be described in further details below.

Turning now to the information retrieval part of the system protocol, in a first step S6, the lightweight client 15 performs an attestation with the secure enclave 16 residing on the full node 11. If the attestation was successful, in a step S7, the lightweight client 15 performs a transport layer security (TLS) handshake and establishes a secure and authenticated communication channel to the enclave 16 using TLS.

If the attestation and to the communication establishment were successful, the lightweight client 15 may identify itself with a unique ID (used by the full node 11 later on for repeated requests and performance optimization) in a step S8. After the acknowledgment by the full node 11 in a step S9, the lightweight client 15 sends a request towards the SGX enclave 16 in a step S10 containing the transactions/ addresses of interest for which the lightweight client 15 needs additional/updated information, such as the amount of unspent BTC, along with the last transaction hash and transaction number. The last two parameters may be used in case that the number of unspent outputs contained by an address is larger than the maximum size of the message. Hence, in these cases a repeated request may be sent by the lightweight client 15 to obtain all the outputs. For example, the lightweight client 15 may receive the first response containing x transaction outputs with an indication that there is more, and in a consequent request specifies the same address as in the first request along with the x—th transaction hash and transaction number. This gives an indication to the enclave 16 to respond with the second batch of outputs starting from that transaction. The process repeats until the client 15 is satisfied.

In step 11, the enclave 16 reads the enclave UTXO database 13$b$ to get the unspent transaction output information in respect to the client's 15 request. The enclave 16 uses ORAM and the previously (i.e. in the above step S5) created index to access and re-randomize the UTXO database 13$b$. In preparation of the response, the enclave 16 includes the relevant information as explained above in connection with step S10, which encompasses the currently included and maximum number of unspent transactions found for a specific address. When these numbers match, the lightweight client 15 knows that he has received all the unspent outputs of a specific address. The enclave 16 additionally may include into its response the block header of the last known block from the local blockchain (longest chain). With this information, the client 15 can deduce whether the enclave16 has been served with the latest block and that the enclave's 16 database is fully updated.

The lightweight client 15 can summarize the unspent transaction outputs received from the enclave 16. The enclave 16 guarantees completeness in terms of transaction confirmation and the current state of the chain, so the client 15 does not have to perform any additional checks by herself. Successful update of the client's 15 internal state results in the connection termination between the enclave 16 and the client 15, as shown in step S13.

As already mentioned earlier, embodiments of the present invention use a construction of ORAM called Path ORAM, as described above in connection with FIG. 4, to protect data access patterns of the enclaves 16. However, in contrast to the scenario described in FIG. 4, the application of Path ORAM in embodiments of the invention is different in that one does not have a traditional client that accesses encrypted storage on a remote server, but instead an enclave 16 that accesses encrypted storage on the machine it resides on, i.e. the full node 11.

In accordance with embodiments of the invention the ORAM database is initialized by creating dummy buckets on disk and filling the position map with randomized entries. The stash is also filled with dummy chunks. After that the ORAM database is fully initialized and can be used to add new unspent outputs from the blockchain 14. The enclave 16 uses randomized encryption to protect the confidentiality and integrity and the ORAM protocol to protect the access patterns. The size of the ORAM database is set according to the size of the UTXO set. The internal state of the ORAM database may not be saved across enclave 16 restarts in order to prevent rollback attacks.

As already mentioned in connection with step S5 of FIG. 5, after initial creation of the enclave UTXO database 13$b$, regular updates of the enclave UTXO database 13$b$ are performed after each new block (received by the enclave 11 in step S3 of FIG. 5). In particular, when a new Bitcoin block arrives, the enclave 16 first verifies the proof of work (PoW). It then extracts all transaction inputs and outputs and bundles them by address. For each address found in the block, the UTXO database 13$b$ entry is requested and then updated with the new information. If too many entries are added, resulting in the chunk getting too big, the chunk is split into two and the index is updated to reflect the changes made to the UTXO database 13$b$. All accesses go through ORAM and, therefore, do not leak any information about access patterns. Accesses to the ORAM database follow the procedure described above in connection with FIG. 4 and in the previously referenced document by E. Stefano et al.

While the usage of ORAM protects against all external leakage, side-channel attacks, and thus, internal leakage remains a challenge. If one considers the most powerful attacker that can perform all digital side-channel attacks, the variant would be forfeit due to the leakage of the code access patterns, specifically, execution paths in the if statements when the stash, indexes and the position map is being accessed. This would leak the exact address that is used to search for the unspent transactions in the internal database.

To remedy the internal leakage, embodiments of the present invention deploy several mechanisms that protect the code and execution. First, when accessing the security critical data structures, specifically, the position map, stash, and the indexes containing information about which chunks contain unspent transactions of a certain Bitcoin address, these security critical data structures may be passed over entirely in the memory to hide the memory access pattern. Second, to hide the execution paths and the control flow, all branching in the code that accesses these data structures may be removed and the cmov assembly instruction may be deployed. cmov is a conditional move such that "If the condition specified in the opcode (cc) is met, then the source operand is written to the destination operand. If the source operand is a memory operand, then regardless of the condition, the memory operand is read", as described in OpCodes: CMOV, 2018, http://www.rcollins.org/p6/op-codes/CMOV.html, which is incorporated by reference herein. Specifically, this mechanism allows to replace branches from the code resulting in the same control flow with no leakage. Observation of the control flow and memory access does not leak whether the operation performed by the enclave 16 was a read or a write, and since there is a single control flow without creating multiple branches depending on the condition, the execution is effectively hided and thus this variant is protected from internal leakage in full. This protection mechanism has negligible performance overhead.

Above all, it is important that the lightweight client 15 can confirm that a trusted and secure enclave 16 is running the code. Attestation only gives the proof that an enclave 16 is executing the presumed code, however, without any other information regarding the enclave 16 itself. Therefore, according to embodiments of the invention an authentication mechanism is deployed when establishing a TLS session between the enclave 16 and a lightweight client 15. In this context, first, the enclave 16 may securely create a private/public key pair during initialization. At the time of attestation, the enclave 16 may add its generated public key into the additional data field of the attestation statement. This allows the other party to use that public key for bootstrapping a TLS session with the enclave 16. Only the attested enclave 16 has the corresponding private key, so the other party can be sure it is talking to exactly the enclave 16 it attested. In addition, one could use a trusted Public Key infrastructure (PKI), where the enclave 16 requests a certificate from a certificate authority based on the same generated public key. The certificate is also appended to the attestation statement, which would allow the lightweight client 15 to also verify the identity of the operator of the full node 11 on which the enclave 16 resides.

Finally, in order to prevent information leakage through the message sizes, e.g. the number of requested addresses, requests may be always of constant size, i.e. the client 15 is required to pad shorter requests and larger queries need to be split up into multiple requests. Preferably, the size is defined to accommodate the majority of requests. Since a lightweight client 15 can choose any available full node 11 to connect to, he can choose to send requests to different nodes 11 to hide the number of sent requests. Similarly, the size of responses is constant and may be chosen to accommodate the majority of responses. If a response does not fit the message size, the full node 11 informs the client 15 of this, such that the client 15 can request the remaining transaction outputs again, or from other nodes 16.

According to embodiments of the invention that make use of oblivious databases as described above, the enclave 16 has to keep state and store a large UTXO set on disk. Currently, the size of the UTXO set (indexed by Bitcoin address) is around 4 GB. According to a real implementation scenario, the bucket size for ORAM may be set to Z=4 so one bucket contains 4 chunks. The chunk sizes may be a set to 32 KB chunk size which then implies a tree height of 16, i.e. 216 buckets. The total resulting file size on disk for the ORAM database amounts to around 8.5 GB. With the selected chunk size of 32 KB, a single chunk can fill up to 32 KB with outputs from one address. If an address has more unspent outputs, the outputs are stored in multiple chunks. Assuming an average output size of 100 B, one ORAM read can return up to 320 outputs for one address. Considering the typical unspent outputs per active address in the Bitcoin network, 12 average outputs per request turned out to be a realistic value, resulting in around 1.2 KB response message size. This response message size is big enough to accommodate for more than 98% of all Bitcoin addresses currently in use.

By making use of ORAM databases, according to embodiments of the invention the system directly fetches the unspent outputs from its UTXO database. Therefore, the time needed is not depending on the number of blocks requested, but on the access times to the ORAM database. Consequently, the system may achieve rather low response times and, in particular for a larger number of blocks, may outperform existing systems. The response message size is also significantly lower than in existing systems, since it only contains the unspent outputs and not the entire transactions and the partial Merkle path.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

The invention claimed is:

1. A method of preserving privacy for usage of a lightweight blockchain client in a blockchain network, the method comprising:

using, in a full blockchain node of the blockchain network, a trusted execution environment (TEE);

establishing a secure communication between the lightweight blockchain client and the TEE;

receiving, by the TEE, a request from the lightweight blockchain client for at least one transaction or address of the lightweight blockchain client;

obtaining, by the TEE, unspent transaction output (UTXO) information with respect to the request from the lightweight blockchain client from a UTXO database by oblivious database access using an oblivious RAM (ORAM) protocol; and removing, by the TEE, all branching in code that accesses ORAM data structures and replacing the branching with cmov assembly instructions.

2. The method according to claim 1, further comprising:
at initialization of the full blockchain node, scanning a blockchain of the blockchain network and storing an original UTXO database in a memory of the full blockchain node; and
updating the original UTXO database in the memory of the full blockchain node based on an addition of one or more blocks to the blockchain.

3. The method according to claim 1, further comprising reading, by the TEE at initialization, an entirety of the blockchain and verifying each block of the blockchain.

4. The method according to claim 1, further comprising generating, by the TEE for itself, a secure UTXO database as the UTXO database, which is a modified version of an original UTXO database stored in a memory of the full blockchain node.

5. The method according to claim 4, wherein generating the secure UTXO database comprises, by the TEE:
encrypting the original UTXO database on the disk as a sealed storage,
introducing indexes for easy and fast access depending on the request from the lightweight blockchain client, and
introducing a randomization using the ORAM protocol.

6. The method according to claim 1, wherein ORAM protocol which is used is the Path ORAM protocol.

7. The method according to claim 1, further comprising, by the TEE when accessing security critical data structures of the ORAM data structure, including stash, indexes and a position map, passing over the data structures entirely in a memory of the TEE.

8. The method according to claim 1, wherein:
the request from the lightweight blockchain client includes addresses of interest for which the lightweight blockchain client needs an information update, together with the last transaction hash and transaction number, and/or
a response of the TEE includes a currently included and maximum number of unspent transactions found for a specific address.

9. The method according to claim 1, wherein, prior to sending a request to the TEE, the lightweight blockchain client performs an attestation with the TEE.

10. The method according to claim 1, further comprising, after successful update of the UTXO information of the lightweight blockchain with respect to the request from the lightweight blockchain client, terminating the secure communication between the lightweight blockchain client and the TEE.

11. A full blockchain node disposed in a blockchain network and using a trusted execution environment (TEE), the full blockchain node being configured to preserve privacy for usage of a lightweight blockchain client by providing for execution of the following steps:
receiving a request from the lightweight blockchain client for a setup of a secure communication;
receiving a request from the lightweight blockchain client for at least one transaction or address of the lightweight blockchain client;
obtaining, by the TEE, unspent transaction output (UTXO) information with respect to the request from the lightweight blockchain client from a UTXO database by oblivious database access using an oblivious RAM (ORAM) protocol;
removing, by the TEE, all branching in code that accesses ORAM data structures and replacing the branching with cmov assembly instructions; and
sending, by the TEE, a response to the request from the lightweight blockchain client for the at least one transaction or address, the response including the obtained UTXO information.

12. The full blockchain node according to claim 11, being further configured to:
scan a blockchain of the blockchain network and to store an original UTXO database in a memory of the full blockchain node; and
update the original UTXO database in the memory of the full blockchain node based on an addition of one or more blocks to the blockchain.

13. The full blockchain node according to claim 11, wherein:
the TEE of the full blockchain node includes a secure software guard extensions (SGX) enclave, and/or
the TEE is configured to read, at initialization, an entirety of the blockchain and to verify each block of the blockchain.

14. The full blockchain node according to claim 11, wherein the TEE of the full blockchain node is configured to generate, for itself, a secure UTXO database as the UTXO database, which is a modified version of an original UTXO database stored in a memory of the full blockchain node, by providing for execution of the following steps:
encrypting the original UTXO database on the disk as a sealed storage,
introducing indexes for easy and fast access depending on the request from the lightweight blockchain client, and
introducing a randomization using the ORAM protocol.

* * * * *